US008533171B2

(12) United States Patent
Patwardhan (10) Patent No.: US 8,533,171 B2
(45) Date of Patent: Sep. 10, 2013

(54) METHOD AND SYSTEM FOR RESTARTING FILE LOCK SERVICES AT AN ADOPTIVE NODE DURING A NETWORK FILESYSTEM SERVER MIGRATION OR FAILOVER (75) Inventor: Kedar Patwardhan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 187 days.

(21) Appl. No.: 13/083,465

(22) Filed: Apr. 8, 2011

(65) Prior Publication Data
US 2012/0259820 A1 Oct. 11, 2012

(51) Int. Cl.
*G06F 7/00* (2006.01)
*G06F 17/00* (2006.01)

(52) U.S. Cl.
USPC .......................................................... 707/704

(58) Field of Classification Search
USPC .......................................................... 707/704
See application file for complete search history.

(56) References Cited

U.S. PATENT DOCUMENTS

| 7,143,097 | B1* | 11/2006 | Olker et al. ............................ 1/1 |
| 7,356,531 | B1* | 4/2008 | Popelka et al. ................ 707/682 |
| 2005/0149528 | A1* | 7/2005 | Anderson et al. .................. 707/9 |
| 2006/0212453 | A1* | 9/2006 | Eshel et al. ...................... 707/10 |
| 2010/0114889 | A1* | 5/2010 | Rabii et al. ..................... 707/737 |

* cited by examiner

*Primary Examiner* — Jorge A Casanova
(74) *Attorney, Agent, or Firm* — Wilmer Cutler Pickering Hale & Dorr LLP (57) ABSTRACT A method for file lock recovery in a distributed computer system. The method includes executing a distributed computer system having a plurality of nodes comprising a cluster, and initiating a network file system server fail over from one node of the cluster to an adoptive node of the cluster. File lock services are then stopped at the adoptive node. File lock services are subsequently restarted at the adoptive node, wherein the restart causes the adoptive node to commence a grace period for other network file system clients to connect to the adoptive node and reclaim file locks. After restarting file lock services, a cluster file system is updated on the adoptive node with process identifiers, and file lock services are resumed at the adoptive node. The cluster file system can be simultaneously exposing the file lock services to other clients as well, like CIFS, etc.

20 Claims, 9 Drawing Sheets

METHOD AND SYSTEM FOR RESTARTING FILE LOCK SERVICES AT AN ADOPTIVE NODE DURING A NETWORK FILESYSTEM SERVER MIGRATION OR FAILOVER

FIELD OF THE INVENTION

The present invention is generally related to digital computer systems.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Companies have come to rely upon high-availability clusters to provide the most critical services and to store their most critical data. In general, there are different types of clusters, such as, for example, compute clusters, storage clusters, scalable clusters, and the like. High-availability clusters (also known as HA Clusters or Failover Clusters) are computer clusters that are implemented primarily for the purpose of providing high availability of services which the cluster provides. They operate by having redundant computers or nodes which are then used to provide service when system components fail. Normally, if a server with a particular application crashes, the application will be unavailable until someone fixes the crashed server. HA clustering remedies this situation by detecting hardware/software faults, and immediately restarting the application on another system without requiring administrative intervention, a process known as Failover. As part of this process, clustering software may configure the node before starting the application on it. For example, appropriate file systems may need to be imported and mounted, network hardware may have to be configured, and some supporting applications may need to be running as well.

HA clusters are often used for critical databases, file sharing on a network, business applications, and customer services such as electronic commerce websites. HA cluster implementations attempt to build redundancy into a cluster to eliminate single points of failure, including multiple network connections and data storage which is multiply connected via storage area networks or Internet protocol-based storage. Additionally, HA clusters are often augmented by connecting them to multiple redundant HA clusters to provide disaster recovery options.

The high availability and disaster recovery solutions strive to decrease the application downtime and application data loss. In case of a disaster like they flood, earthquake, hurricane, etc., the applications running in the impacted cluster should be failed over to another cluster at the earliest to ensure that the business continuity is maintained. In order to facilitate fast failover of the applications, the cluster failures should be detected in the timely manner.

In high availability environments involving a cluster file system (CFS), when a NFS (network file system) server (e.g., a cluster node) crashes or NFS server needs to be relocated from one CFS node to another, all cluster file system level-file lock operations needs to be paused till the time NFS server has completed failover. File lock operations are resumed only after the NFS server has completed its failover. When there are simultaneous failovers, which can be due to either reconfiguration or manual migration, a problem occurs when file lock processing resumes before all of the failovers due to both reconfigurations and manual migrations are over.

SUMMARY OF THE INVENTION

In one embodiment, the present invention is implemented as a method for file lock recovery in a distributed computer system. The method includes executing a distributed computer system having a plurality of nodes comprising a cluster, and initiating a network file system server fail over from one node of the cluster to an adoptive node of the cluster. File lock services are then stopped at the adoptive node. File lock services are subsequently restarted at the adoptive node, wherein the restart causes the adoptive node to commence a grace period for other network file system clients to connect to the adoptive node and reclaim file locks. After restarting file lock services, the method includes updating a cluster file system on the adoptive node with process identifiers, selectively resuming network file system file lock recovery requests on the adoptive node during the grace period, and resuming normal file lock services at the adoptive node after network file system file lock recovery has completed.

In one embodiment, the grace period for other network file system clients to connect to the adoptive node and reclaim file locks, and wherein the file locks were previously held by the network file system clients.

In one embodiment, the file lock services are controlled by a file lock recovery agent.

In one embodiment, the file lock recovery agent is instantiated on each of the plurality of nodes comprising the cluster.

In one embodiment, the file lock recovery agent entertains file lock requests from process identifiers of the file lock services which were previously registered with a cluster file system on the adoptive node.

In one embodiment, the file lock recovery agent is configured to entertain file lock requests originating from the process identifiers, wherein during the grace period, no new file lock requests are processed from network file system clients.

In one embodiment, file lock requests already held by the network file system clients are processed during the grace period, and wherein after the grace period expires, file lock services are fully resumed at the adoptive node.

In one embodiment, the present invention is implemented as a computer readable storage medium having stored thereon, computer executable instructions that, if executed by a computer system cause the computer system to perform a method for file lock recovery in a distributed computer system. The method includes executing a distributed computer system having a plurality of nodes comprising a cluster, and initiating a network file system server fail over from one node of the cluster to an adoptive node of the cluster. File lock services are then stopped at the adoptive node. File lock services are subsequently restarted at the adoptive node, wherein the restart causes the adoptive node to commence a grace period for other network file system clients to connect to the adoptive node and reclaim file locks. After restarting file lock services, a cluster file system is updated on the adoptive node with process identifiers, and file lock services are resumed at the adoptive node.

In one embodiment, the present invention is implemented as server computer system, including a computer system having a processor coupled to a computer readable storage media and executing computer readable code which causes the computer system to implement a file lock recovery agent. The file lock recovery agent functions by executing a distributed computer system having a plurality of nodes comprising a cluster, and initiating a network file system server fail over from one node of the cluster to an adoptive node of the cluster. File lock services are then stopped at the adoptive node. File lock services are subsequently restarted at the adoptive node, wherein the restart causes the adoptive node to commence a grace period for other network file system clients to connect to the adoptive node and reclaim file locks. After restarting file lock services, a cluster file system is updated on the adoptive node with process identifiers, and file lock services are resumed at the adoptive node.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Figure 1:
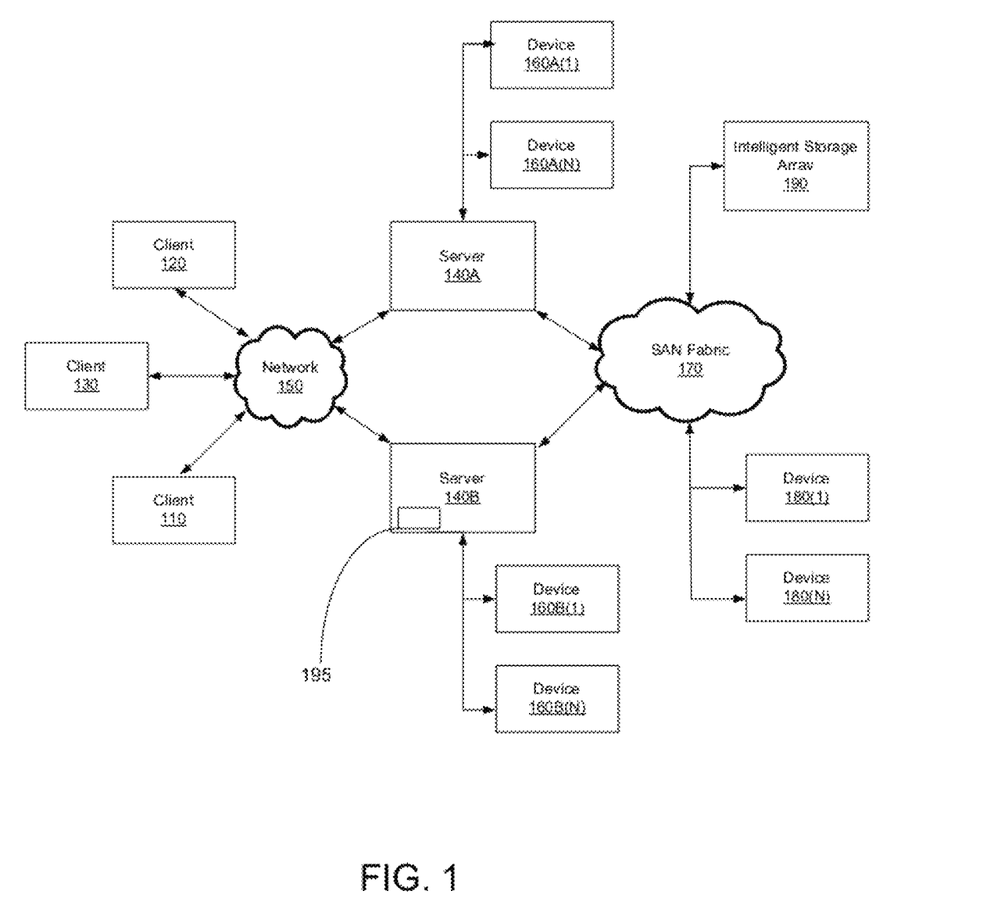
FIG. 1 shows a diagram depicting a network architecture of a client server based computing system in accordance with one embodiment of the present invention.

FIG. 1 is a block diagram depicting a network architecture 100 in which client systems 110, 120 and 130, as well as storage servers 140A and 140B (e.g., it will and any of which can be implemented using computer system 200), are coupled to a network 150 in accordance with one embodiment of the present invention. A storage server 140A is further depicted as having storage devices 160A(1)-(N) directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. SAN fabric 170 also supports access to a storage array 190, which is also shown as an example of a specific storage device. Certain functionality of embodiments of the present invention are implemented via a file lock recovery agent 195, which is shown as instantiated on the server 140B.

Client computer systems 110, 120 and 130 are communicatively coupled via the network 150. Client systems 110, 120 and 130 are able to access information on data server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or storage array 190. Additionally, FIG. 1 depicts the use of a network such as the Internet for exchanging data, but the present disclosure is not limited to the Internet or any particular network-based environment. It should be noted that although two data server nodes 140A and 140B are shown, embodiments of the present invention can function with highly scalable distributed computer systems having hundreds of nodes, or more (e.g., cloud computing system, etc.).

Figure 2:
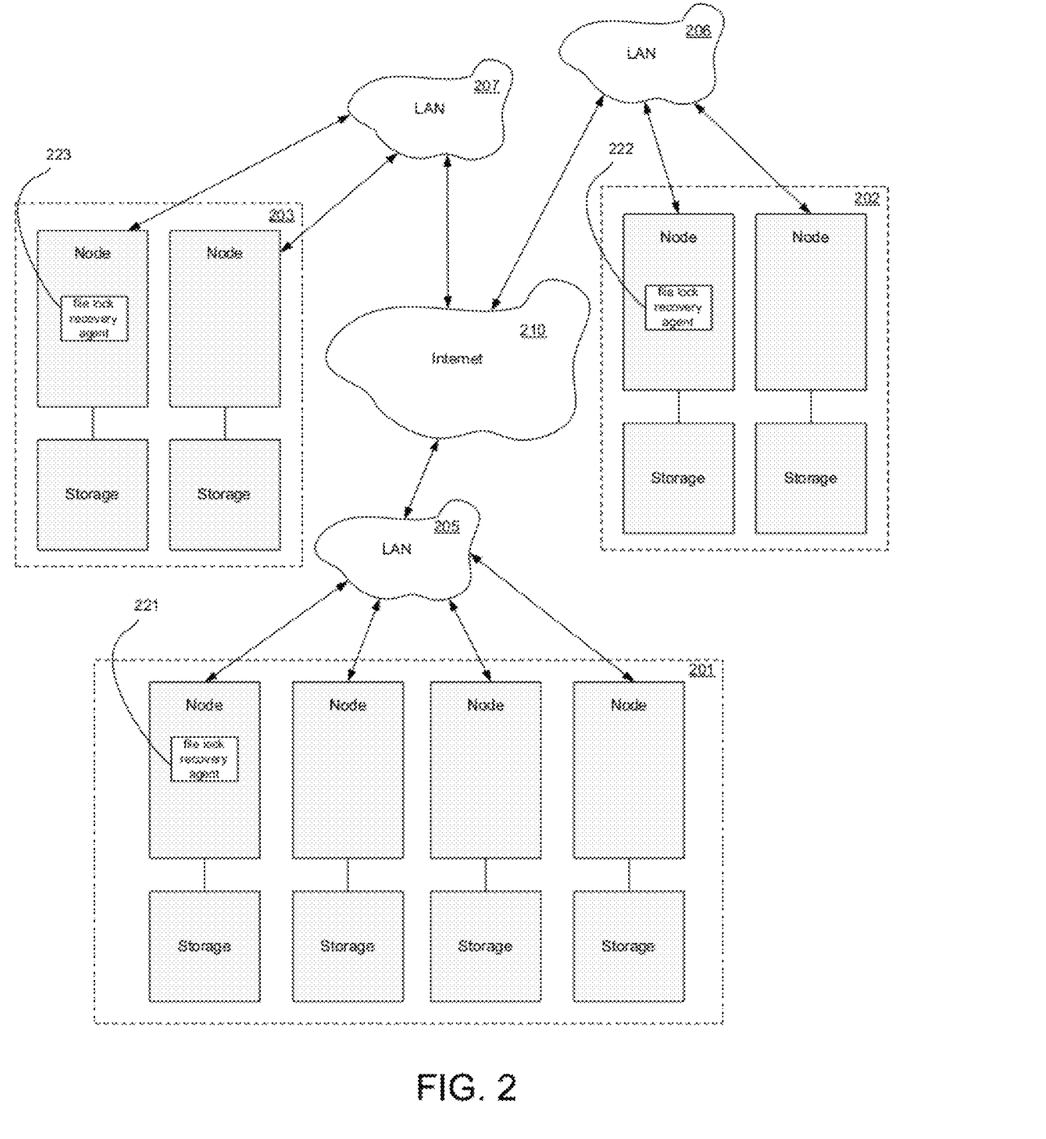
FIG. 2 shows a diagram depicting a high availability multi-cluster-based computing system in accordance with one embodiment of the present invention.

FIG. 2 shows a diagram depicting a high availability multi-cluster-based computing system in accordance with one embodiment of the present invention. As illustrated in FIG. 2, three clusters 201-203 are shown. The clusters 202-203 each comprise a two node cluster. Cluster 201 comprises a four node cluster. Each of the constituent nodes is shown connected to a respective storage device (e.g., disk drive, etc.). The nodes of each cluster communicate with one another via local area networks 205-207. These local area networks are in turn connected to the Internet 210. Although the embodiments described in the context of clusters of two nodes and four nodes, it should be appreciated that embodiments of the present invention can readily scale and function in distributed computer systems and/or cloud based computer systems having hundreds or thousands of nodes.

Thus, FIG. 2 shows the basic layout of a typical high-availability multi-cluster computer system environment. As described above, a high availability cluster is a computer cluster that functions primarily by providing high availability of services to users and/or applications. The multiple redundant nodes of each cluster 201-203 are used to provide service in case one or more nodes of a cluster should fail. For example, if a node with a particular application crashes, the application will be unavailable until the node is recovered. HA clustering implements a fail over of the particular application to one of the redundant nodes of the cluster.

FIG. 2 also shows the inclusion of a plurality of file lock recovery agents 221-223 in each of the clusters 201-203. The file lock recovery agents 221-223 implement the systematic and efficient file lock recovery functionality upon the occurrence of a node failure or migration in accordance with embodiments of the present invention. In addition to failing over one or more nodes to a redundant node within a cluster, embodiments of the present invention utilize redundant clusters to provide failover support to a failed cluster. Embodiments of the present invention enable the detection of a failed or migrated node or cluster, and supports the smooth failover of applications to an adoptive one or more redundant nodes or clusters. In the FIG. 2 embodiment, there exists at least one file lock recovery agent instantiated in each cluster, however, to provide redundancy, reliability, and the like, file lock recovery agents can be instantiated on each node of a given cluster.

Figure 3:
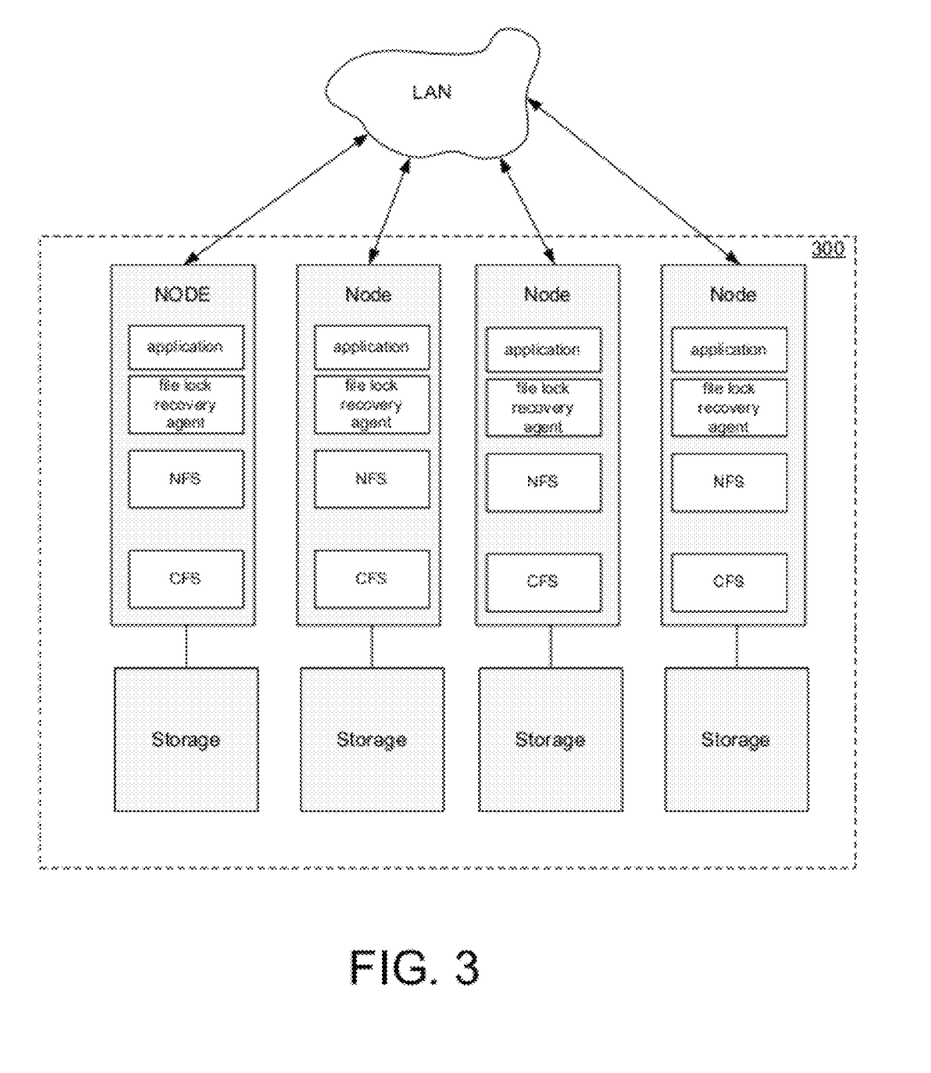
FIG. 3 shows also shows the communications pathways between the nodes of an exemplary cluster in accordance with one embodiment of the present invention.

FIG. 3 shows also shows the communications pathways between the nodes 301-304 of an exemplary cluster 300 in accordance with one embodiment of the present invention. In one embodiment, this communication is IP based communication (e.g., TCP/IP communication and addresses). As described above, a tightly-coupled distributed computing system typically consists of multiple clusters of computing nodes which communicate with each other in order to facilitate processing of the computation tasks. Within a given cluster, at the time of failure of one node, the other nodes in the cluster take over, or adopt, the tasks that were assigned to the failed node prior to the failure. A node can lose communication with other nodes of the cluster because of loss of network connectivity or because of the failure of that node.

The high availability and disaster recovery solutions typically rely on an inquiry protocol to distinguish between a temporary network outage and the actual node failure. If there is a loss of communication between a node and other nodes of the cluster, then each of the other nodes (e.g., if they are alive) send an inquiry request messages to other nodes of the cluster which act as a "witnesses", in order to determine the health of the node with which the communication is lost.

For example, in one embodiment, upon receiving the inquiry request message, the inquired nodes or witnesses check if they are able to communicate with the node for which the inquiry was made. Based on that, they send back affirmative or negative inquiry response to the node that sent the inquiry request message. Based on the inquiry responses from the inquired nodes, the inquiring node determines whether the communication loss is because of a temporary network outage or node failure.

Referring still to FIG. 3, upon the determination that the loss of communication with a given node is in fact due to node failure, a migration needs to be performed. In the case of a manual migration, for example, when an NFS (Network File System) server crashes (e.g., for reasons other than node crash), an administrator will want to move NFS server from one node to another. This procedure is called manual migration. Manual migration can also be performed as part of load balancing within the cluster.

It should be noted that the cluster 300 is typically employed to host a Clustering Services Application. A clustering services application comprises an application that provides high availability to various services/resources offered in a cluster. Example of such applications include VCS, HP-service guard, HA-CMP, Sun Clustering Services, etc.

Each of the nodes of cluster 300 are also shown including a CFS component. CFS refers to a cluster file system which, in one embodiment, can be version of VxFS. A fundamental property of CFS is that it allows concurrent read/write access to a shared storage component (e.g., LUN, etc.) in a cluster environment. Additionally, CFS also implements much of the high availability functionality for user applications. For example, upon the occurrence of node failure, the NFS and CFS will continue to provide services on other nodes. CFS will keep on providing services as cluster nodes join or leave the cluster. A reconfiguration in CFS occurs when the membership set of the cluster changes. The membership set changes when one or more nodes joins or leaves the cluster. As a part of reconfiguration, CFS takes certain actions when a node joins or leaves the cluster.

NFS is a type of distributed file system based on client/server model, that allows NFS servers to give access to their file systems to NFS client over the network. Systems having NFS clients can access/modify data on a remote system (e.g., which is an NFS server) as if they were accessing/modifying data on their own local storage.

Using the file lock recovery agents, NFS. components and CFS components, embodiments of the present invention can implement a high availability environment involving a cluster file system (CFS), such that when a NFS server or node crashes (e.g., referred to as cluster membership reconfiguration or reconfiguration for short) or a NFS server needs to be relocated from one CFS node to another (known as manual migration), all cluster file system level-file lock (e.g., also called frlock) operations are paused for sufficient time to allow the NFS server to complete its failover. Only after the NFS server has completed its failover will normal frlock processing be resumed. Additionally, when there are simultaneous failovers (e.g., which can be due to either reconfiguration or manual migration), embodiments of the present invention safely and intelligently resumes the frlock processing only when failovers/migrations are over.

Figure 4:
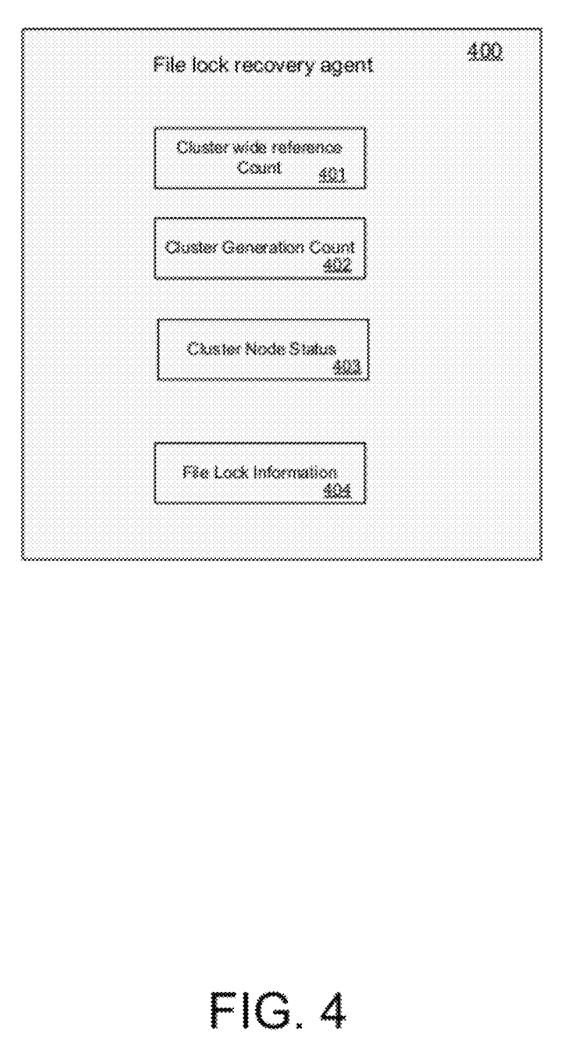
FIG. 4 shows a diagram depicting a file lock recovery agent in accordance with one embodiment of the present invention.

FIG. 4 shows a diagram depicting a file lock recovery agent 400 in accordance with one embodiment of the present invention. As depicted in FIG. 4, the file recovery agent 400 includes a cluster wide reference count 401, a cluster generation count 402, cluster node status 403 and the file lock information 404.

FIG. 4 shows an embodiment where the information 401-404 is hosted within a file lock recovery agent. It should be noted that in different embodiments, any one of the components 401-404 can reside within a CFS component, an NFS component or a clustering services application.

In one embodiment, the components 401-404 provide the enabling infrastructure for NFS server migration/failover. The cluster wide reference count 401 is for maintaining a count about any migrations in progress. The cluster wide reference count is incremented for every migration on all nodes of a cluster on a per node basis. Any number of CFS nodes are allowed to join/leave the cluster during the migration phase. Target nodes for the NFS server migration can change as a result. The file lock recovery agent explicitly decrements the migration count after completion of the NFS server migration event and the said count is decremented cluster wide by the file lock recovery agents on each of the other nodes of the cluster.

In one embodiment, the cluster generation count 402 provides the enabling CFS infrastructure for NFS server migration/failover due to reconfiguration. The file lock recovery agent provides notification to other applications/agents on the other nodes of the cluster to inform them about a join/ejection of a CFS node from a CFS cluster. Upon any join or ejection from the cluster, the generation count is incremented. The file lock recovery agents of each of the nodes also maintain the generation count with each such notification and implement a mechanism to reconcile the generation count last processed by the file lock recovery agent with the current generation count of the cluster file system. In this manner, when a new NFS server boots up and joins the cluster, it can reconcile its generation count with the current cluster wide generation count, and can update is file lock information accordingly.

Figure 5:
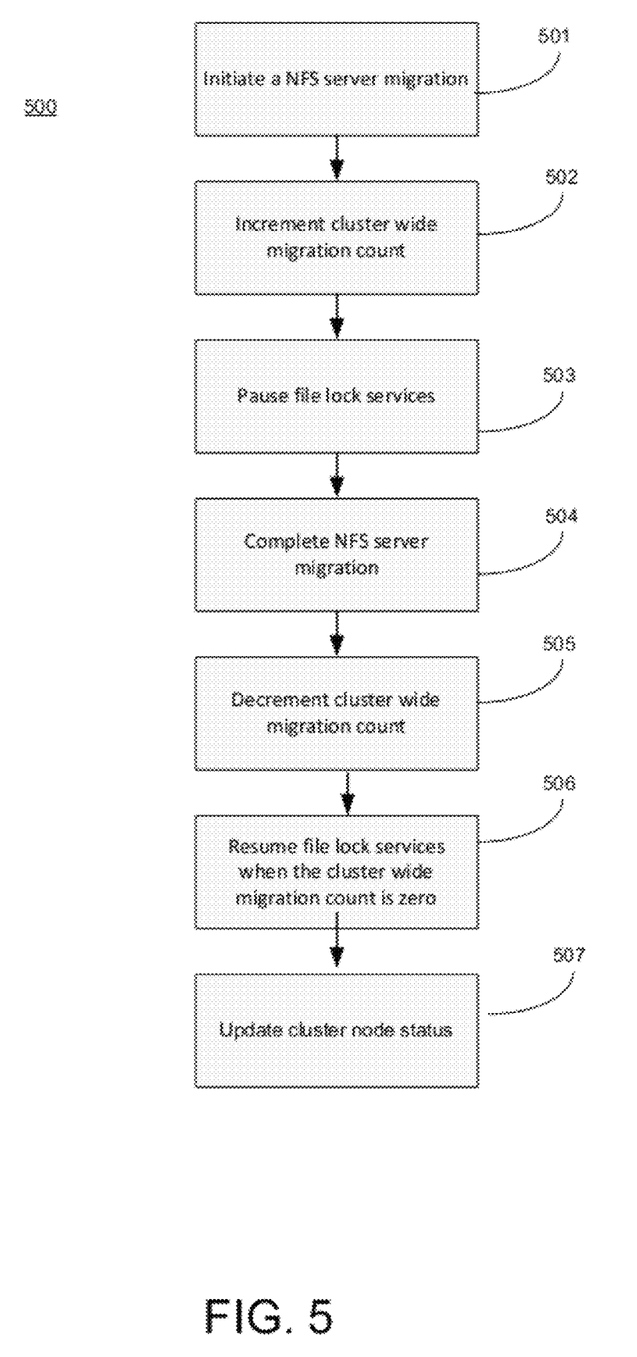
FIG. 5 shows a flowchart of the steps of a process for performing clean file lock recovery during a NFS server manual migrations/failover in accordance with one embodiment of the present invention.

FIG. 5 shows a flowchart of the steps of a process 500 for performing clean file lock recovery during a NFS server manual migrations/failover in accordance with one embodiment of the present invention.

Process 500 begins in step 501, where an NFS service migration is initiated. In step 502, when an administrator initiates a manual migration of an NFS server, the cluster wide migration count for that cluster is incremented. In step 503, all frlock processing is paused for that migrating file system on all concerned CFS nodes. In step 504, the NFS migration is processed to completion. Then in step 505, the cluster wide per file system migration count is decremented. In step 506, file lock services are resumed on the migrated NFS server. And in step 507, the cluster node status is updated at each of nodes of the cluster.

It should be noted that in one embodiment, the decrementing of the cluster wide migration count can be initiated from any of the node of the cluster. If the migration reference count becomes zero (which means all manual migrations have been processed), then frlock processing will be resumed on all nodes.

Figure 6:
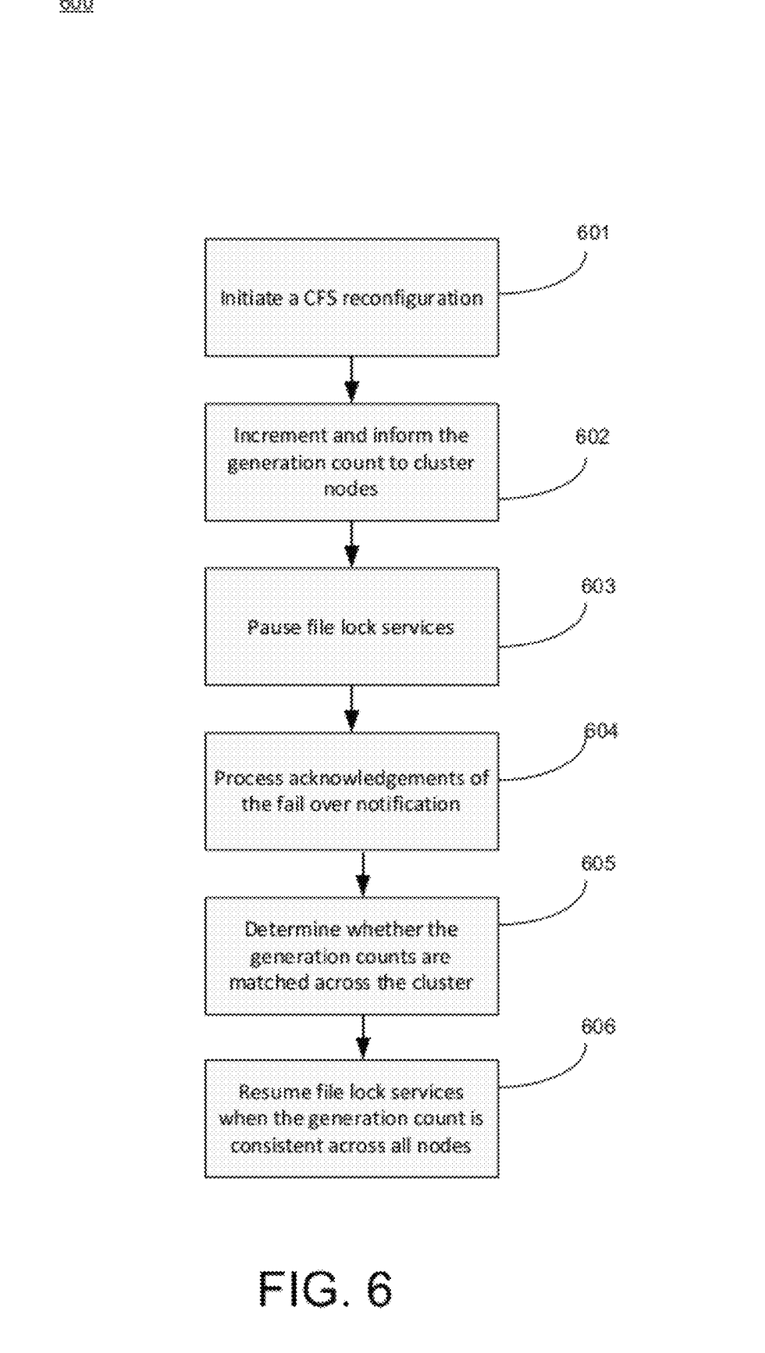
FIG. 6 shows a flowchart of the steps of a process for performing clean file lock recovery during a NFS server reconfiguration migration/failover in accordance with one embodiment of the present invention.

FIG. 6 shows a flowchart of the steps of a process 600 for performing clean file lock recovery during a NFS server reconfiguration migration/failover in accordance with one embodiment of the present invention.

Process 600 begins in step 601, where a CFS reconfiguration is initiated. In step 602, the generation count is incremented and the cluster node status is updated at each of the nodes of the cluster. In step 603, all frlock processing is automatically paused at all nodes at this point. In step 604, it documents from each of the nodes are processed to ensure all nodes acknowledged the new generation count. In step 605, a determination is made as to whether the generation count are matched across the cluster. If there are multiple reconfigurations, the file lock recovery agents are each communicated the new generation count and the cluster node status is updated with information concerning membership for any newer cluster membership change.

In step 606, frlock processing resumes when the generation count is consistent across all nodes. All frlock processing continues to remain paused till the reconfiguration with the latest generation (i.e. membership) is acknowledged as processed by the clustering services application.

In one embodiment, frlock processing would be conditionally enabled cluster wide in two contexts; either when CFS is notified about completion of a NFS server migration activity or after the latest reconfiguration has been processed and acknowledged by the cluster services application. In such embodiment, each node will allow frlock processing on itself when it is informed that NFS server migration processing of a CFS file system is complete and there are no reconfigurations (as known to that node) that have not been communicated and/or processed and/or acknowledged by the clustering services application and there are no migrations that are also pending for the same file system. Similarly, each node would allow frlock processing on itself when cluster services application acknowledges completion of processing of the latest known reconfiguration (as known to that node) provided that there are no pending migrations for that file system in the cluster.

In one embodiment, in a client/server setting, an exemplary NFS set up consists of an NFS server and one or more NFS clients. NFS Clients can remotely access the file system which is mounted and NFS exported from the NFS server. NFS server comprises of set of daemons (e.g., the file lock recovery agent) which perform various tasks on NFS Server's behalf.

For example, a typical client/server exchange, processes in a NFS client can lock files via fcntl( )/lockf/flock interface after NFS has mounted the remote file system from NFS server. The NFS client will then send these lock requests to NFS server. The NFS server processes the lock request and if granted records the file lock information and client hostname in a file (e.g., file lock information 404). After a file lock grant reaches the client, the client also records the server hostname and lock information. When the NFS server crashes, the NFS server applications and services need to be resumed at earliest in accordance with the high availability environment on a surviving node of the cluster. Subsequently, a backup/failover node resumes the NFS services as provided on the primary node.

When NFS server crashes, lock information stored on the said NFS server is lost. The CFS informs a clustering services application and/or NFS of the death of the cluster node exporting the NFS file system. To recover the lock information and resume the normal services, the failover NFS server sends notifications to clients to reclaim the locks. The file lock recovery agent then blocks frlock operations till the time the failover NFS server recovery is complete. In response to the notification sent by the newly adoptive NFS server, clients will come back with reclaim request for the locks already taken by them before the original NFS server crashed. The adoptive NFS server will admit the reclaim lock requests for a particular time period. After reclaim phase is over, the adoptive NFS server will process the lock reclaim requests and will notify CFS to resume the normal frlock processing.

Figure 7:
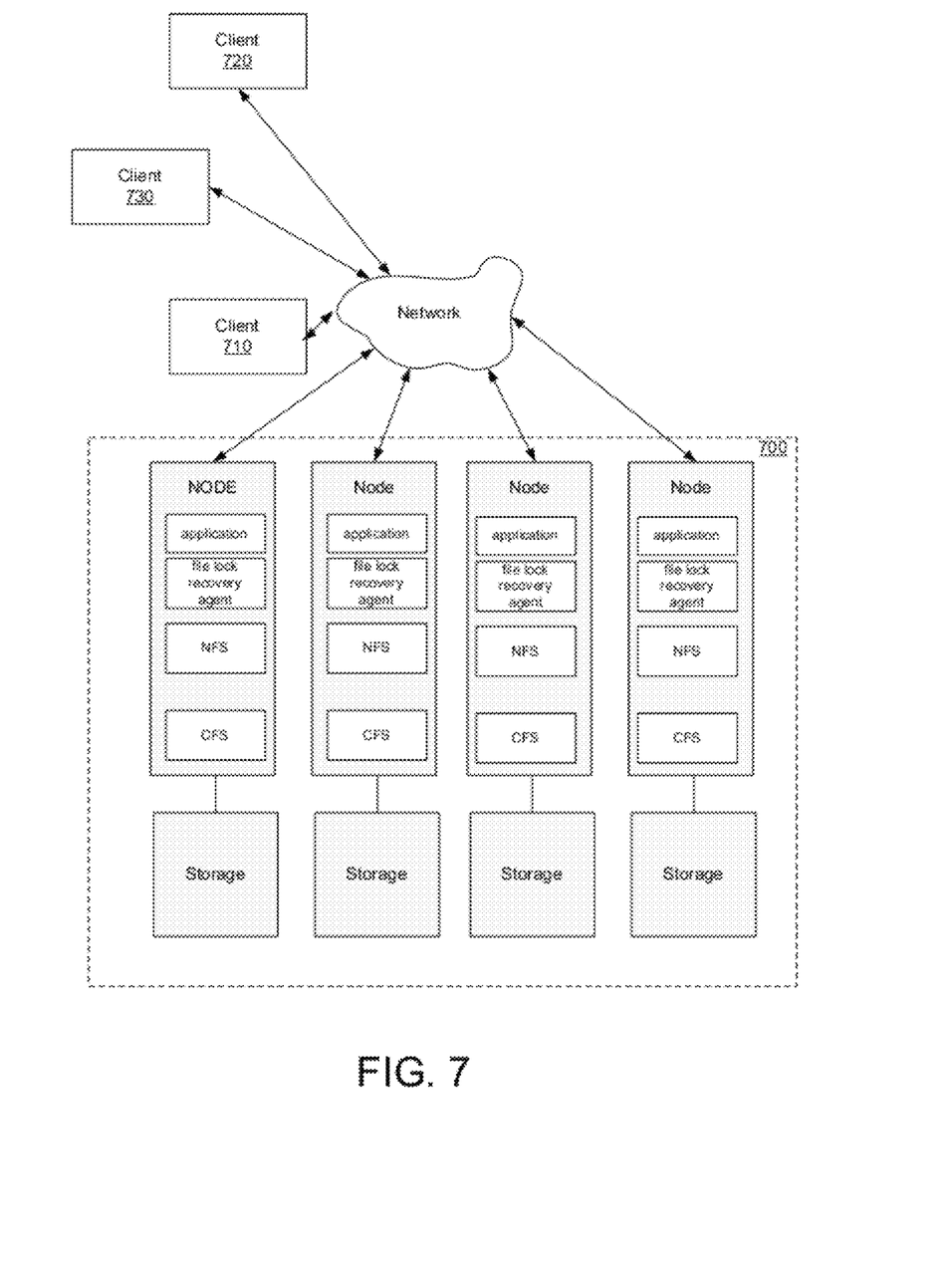
FIG. 7 shows an exemplary CFS cluster that exports multiple file systems to the clients in accordance with one embodiment of the present invention.

FIG. 7 shows an exemplary CFS cluster that exports multiple file systems to the clients 710-730 in accordance with one embodiment of the present invention. The nodes of cluster want to export the same cluster file system over CIFS and as well want to run applications that can generate file lock requests that conflict with each other. More than one node of the CFS cluster runs a NFS server for the same cluster file system. Each such NFS server is connected to it's NFS clients. The NFS servers and NFS clients are out-of-the-box (standard) versions of the NFS software.

Existing cluster NFS solutions, such as CNFS, allow transparent file lock failover of the file locks held on the dead node of the cluster (before it's death) to an adoptive node in the cluster (the node to which NFS clients belonging to the dead CFS node get redirected to). Embodiment of the present invention implement a method whereby a cluster can provide CNFS service with application transparent file lock recovery and failover when running 'out-of-the-box' NFS server on the CFS cluster and yet allow concurrent CIFS or local application/server generated file lock requests on the same NFS exported cluster file system. These embodiments are now described.

File locks held by NFS clients need to be failed to a surviving CFS node (also exporting the same CFS file system over NFS) over when the CFS node that they were connected to dies. This process involves identifying the surviving node or hereto referred to as 'adoptive' node on which the NFS clients along with their previously help file lock requests failover to. Such a failover is successful only when the CFS nodes not expose the same NFS exported CFS file system to file lock requests from CIFS and/or other servers/applications that can also generate file lock requests. Embodiments of the present invention work around these restrictions so that the CFS cluster can serve CNFS, CIFS and other applications on the same CFS cluster.

In a typical imitation, when a CFS node dies, NFS clients which connected to that CFS node need to connect to another NFS server in that cluster (e.g., the adoptive node). The said NFS clients also need to failover the file locks that they had already held. As part of reconfiguration processing, CFS automatically block processing all file lock requests, as described above. In one embodiment, this can be achieved by killing the statd and lockd processes (e.g., NFS locking daemons) on the adoptive node and then restarting them, also referred hereafter as restarting NFS.

Restarting NFS on the adoptive node results in the adoptive node executing a special algorithm on the adoptive node whereby, it waits for a certain grace period for the NFS clients to connect to it and inform it about file locks already held by the NFS clients. During the grace period, the NFS server does not process any 'new' file lock requests from NFS clients but only reclaims (or fails over) the file lock requests already held by the NFS clients. After grace period expiration, CFS is informed to re-enable all of it's file lock processing. During or immediately before the grace period expiry, the NFS server forwards the accumulated file lock requests (file lock reclaim requests from NFS clients) to the CFS file system underneath for processing (lock grants). Thereafter the NFS server accepts only new file lock requests from all NFS clients and submits them to the underneath file system for processing (grants).

If the CFS adoptive node also was running a CIFS server or any application/server that could generate file lock requests, the same would be processed by the CFS implementation even during the grace period set by the NFS server. This is so since the NFS server and CFS are loosely coupled. Even if CFS were to be instructed to block all file lock processing over the grace period, immediately as soon as the grace period was over, CFS would process file lock reclaim requests from the NFS server as well as any other file lock requests (possibly conflicting with the NFS file lock reclaim requests) from any local applications/server or CIFS server running on the same adoptive node or any other node in the cluster. If in the above scenario, CFS were to grant a file lock request from CIFS or of any other origin except NFS reclaim file lock request, there would be a correctness issue since NFS would be unable to reclaim a file lock request for a NFS client which already had it held.

It should be noted that to solve this problem, conventional CNFS solutions require that the CFS cluster not any other kind of applications, services, or servers on the CFS cluster (except NFS of course) which can also generate file lock requests. However, embodiments of the present invention enable CNFS as well as other applications, services, servers capable of generating file lock requests to run on the same CFS cluster.

In a cluster as mentioned in the operating setup, when a CFS node dies, NFS clients which connected to that CFS node need to connect to another NFS server in that cluster (adoptive node). This is called hereto as reconfiguration processing where the cluster reconfigures itself in response to death of a node or set of nodes. The said NFS clients also need to failover the file locks that they had already held. As part of reconfiguration processing CFS should automatically block processing all file lock requests. In one embodiment, this is achieved by killing the statd and lockd processes (NFS locking daemons) on the adoptive node and then restarting them, also referred hereafter as restarting NFS. Restarting NFS on the adoptive node results in the adoptive node executing a special algorithm on the adoptive node whereby, it waits for a certain grace period for the NFS clients to connect to it and inform it about file locks already held by the NFS clients.

In one embodiment, after restarting statd/lockd, the file lock recovery agent informs CFS on the adoptive node of the PIDs of the restarted statd and lockd services. Also, the file lock recovery agent is configured to entertain file lock requests (reclaim requests) originating from the PIDs of statd and lockd. During the grace period, the NFS server does not process any 'new' file lock requests from NFS clients but only reclaims (or fails over) the file lock requests already held by the NFS clients. After grace period expiry, the file lock recovery agent is informed to re-enable all of it's file lock processing.

However, in one embodiment, instead of re-enabling all file lock processing, the file lock recovery agent entertains file lock requests only from PIDs of statd and lockd (which were already registered with CFS on the adoptive node) during the grace period. In one embodiment, the sociality can be achieved by modifying the NFS failover software (like VCS or such) to communicate the PIDs of the restarted statd and lockd processes to CFS via a private IOCTL. During or immediately before the grace period expiry, the NFS server forwards the accumulated file lock requests (file lock reclaim requests from NFS clients) to the CFS file system underneath for processing (lock grants). Thereafter the the NFS server accepts only new file lock requests from all NFS clients and submits them to the underneath file system for processing (grants).

In one embodiment, if the CFS adoptive node also was running a CIFS server or any application/server that could generate file lock requests, the same would now not be processed by the CFS implementation during the grace period set by the NFS server. This is so since the CFS has been informed and coded to entertain file lock requests only from PIDs of the statd and lockd processes. In such an embodiment, NFS server and CFS would still remain loosely coupled. Additionally, in such an embodiment, changes would be required only in CFS and the NFS failover processing software (like VCS and such).

In one embodiment, after the expiry of the grace period, CFS is informed via another IOCTL issued by the NFS failover processing software (like VCS or such) to enable ALL file lock processing. CFS would now process file lock from the NFS server as well as any other file lock requests (possibly conflicting with the NFS file lock reclaim requests) from any local applications/server or CIFS server running on the same adoptive node or any other node in the cluster. If in the above scenario, CFS cannot inadvertently grant a file lock reclaim request (from NFS) to any other application, server or service since CFS was modified to entertain and/or process only NFS reclaim lock requests during the grace period. Thereafter, any file lock request originating from any application, server or service that conflicts with a reclaim file lock request issued by NFS would get blocked/denied and the correctness issue associated therewith without the invention gets amicably resolved without any changes to NFS server or to statd or lockd daemons.

Figure 8:
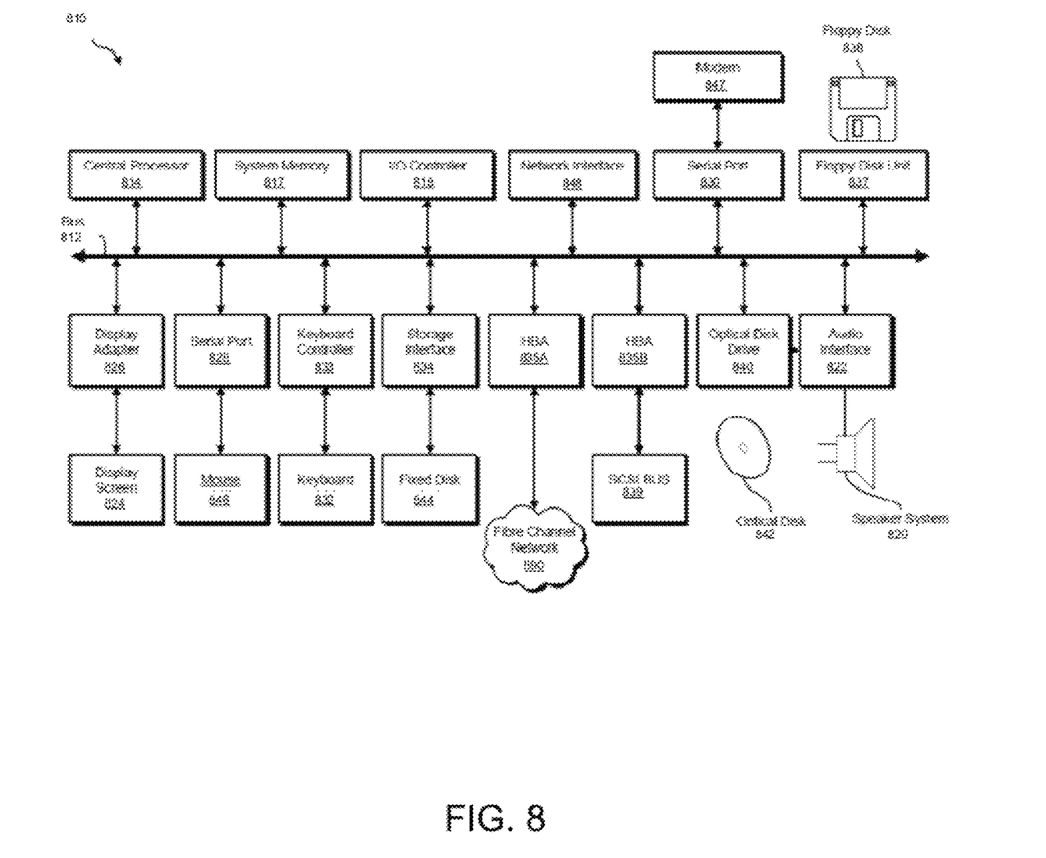
FIG. 8 depicts a block diagram of a computer system suitable for implementing certain functionality in accordance with one embodiment of the present invention.

FIG. 8 depicts a block diagram of a computer system 810 suitable for implementing certain functionality in accordance with one embodiment of the present invention. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fiber Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. In the FIG. 8 embodiment, the system memory 817 instantiates a replication manager module 850 which implements the continuous replication functionality described above. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
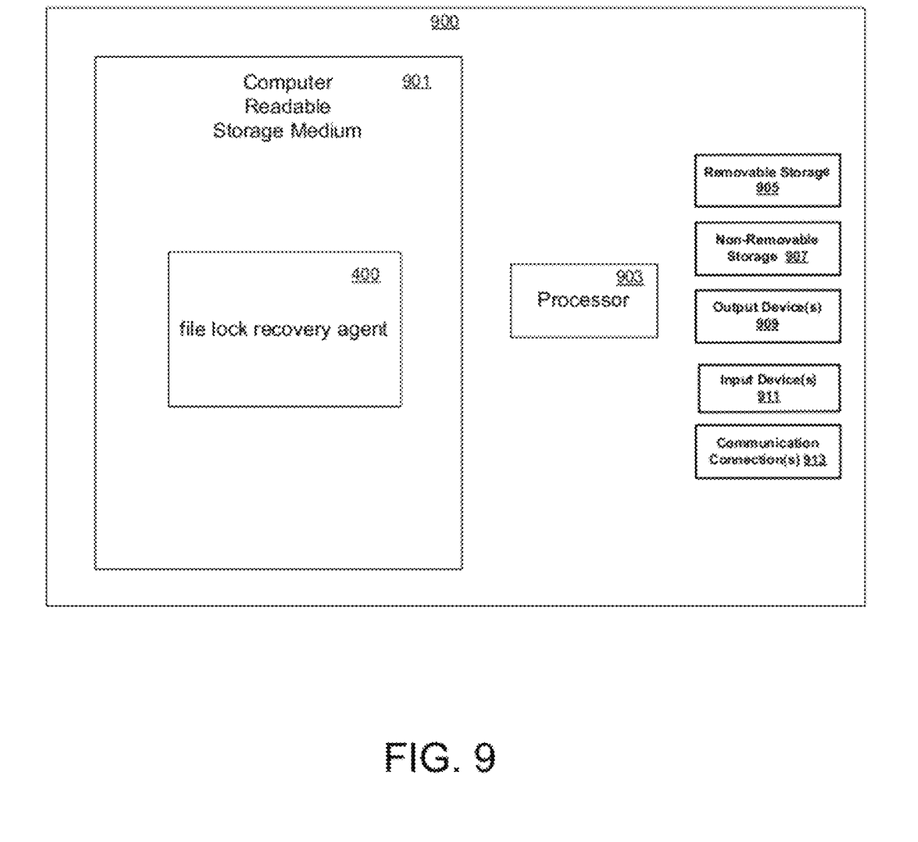
FIG. 9 shows an exemplary computer system according to one embodiment.

FIG. 9 shows an exemplary computer system 900 according to one embodiment. Computer system 900 depicts the components of a basic computer system providing the execution environment for certain hardware-based and software-based functionality for the above described embodiments. For example, computer system 900 can be a system upon which the one or more software agents (e.g., for no one recovery agent 400 from FIG. 1) are instantiated. Computer system 900 can be implemented as, for example, a server computer system, workstation computer system, desktop computer system, or laptop computer system. Similarly, computer system 900 can be implemented as a handheld device. Computer system 900 typically includes at least some form of computer readable media (e.g., computer readable storage medium 901). Computer readable media can be a number of different types of available media that can be accessed by computer system 900 and can include, but is not limited to, computer storage media.

In its most basic configuration, computer system 900 typically includes processing unit 903 and memory 901. Depending on the exact configuration and type of computer system 900 that is used, memory 901 can be volatile (e.g., such as DRAM, etc.) 901a, non-volatile 901b (e.g., such as ROM, flash memory, etc.) or some combination of the two. Similarly, the memory 901 can comprise other devices besides solid-state devices, such as, for example, magnetic disk-based media, optical media, or the like.

Additionally, computer system 900 can include other mass storage systems (e.g., removable 905 and/or non-removable 907) such as magnetic or optical disks or tape. Similarly, computer system 900 can include input devices 909 and/or output devices 911 (e.g., such as a display). Computer system 900 can further include network connections 913 to other devices, computers, networks, servers, etc. using either wired or wireless media. As all of these devices are well known in the art, they need not be discussed in detail.

It should further be noted, that the computer system 900 can have some, most, or all of its functionality supplanted by a distributed computer system having a large number of dispersed computing nodes, such as would be the case where the functionality of the computer system 900 is partly or wholly executed using a cloud computing environment.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for file lock recovery in a distributed computer system, comprising:
   executing a distributed computer system having a plurality of nodes comprising a cluster;
   initiating a fail over for a network file system server from one node of the cluster to an adoptive node of the cluster;
   incrementing a cluster wide migration counter;
   pausing lock processing on the network file system;
   stopping file lock services at the adoptive node;
   restarting file lock services at the adoptive node, wherein the restart causes the adoptive node to commence a grace period for other network file system clients to connect to the adoptive node and reclaim file locks;
   after restarting file lock services, updating a cluster file system on the adoptive node with process identifiers;
   selectively resuming network file system file lock recovery requests on the adoptive node during the grace period;
   decrementing the cluster wide migration counter;
   resuming file lock services at the adoptive node after NFS file lock recovery has completed; and
   resuming lock processing on the network file system if the counter is zero.

2. The method of claim 1, wherein the grace period allows for other network file system clients to connect to the adoptive node and reclaim file locks, and wherein the file locks were previously held by the network file system clients.

3. The method of claim 1, wherein the file lock services are controlled by a file lock recovery agent or the NFS server itself.

4. The method of claim 3, wherein the file lock recovery agent is instantiated on each of the plurality of nodes comprising the cluster.

5. The method of claim 3, wherein the file lock recovery agent and the cluster file system entertain file lock requests from process identifiers of the file lock services which were previously registered with a cluster file system on the adoptive node.

6. The method of claim 3, wherein the file lock recovery agent and the cluster file system is configured to entertain file lock requests originating only from the process identifiers or NFS server lock reclaim requests, on the adoptive node, wherein during the grace period, no new file lock requests are processed from network file system clients or from any other source within the cluster.

7. The method of claim 6, wherein file lock requests already held by the network file system clients are processed during the grace period, and wherein after the grace period expires and NFS file lock recovery is deemed to be complete, file lock services are fully resumed at the adoptive node.

8. A computer system comprising:
   a computer processor; and
   memory coupled to said processor and having stored therein instructions that, if executed by said computer processor, cause said computer processor to execute a method comprising:
      executing a distributed computer system having a plurality of nodes comprising a cluster;
      initiating a fail over for a network file system server from one node of the cluster to an adoptive node of the cluster;
      incrementing a cluster wide migration counter;
      pausing lock processing on the network file system;
      stopping file lock services at the adoptive node;
      restarting file lock services at the adoptive node, wherein the restart causes the adoptive node to commence a grace period for other network file system clients to connect to the adoptive node and reclaim file locks;
      after restarting file lock services, updating a cluster file system on the adoptive node with process identifiers;
      selectively resuming network file system file lock recovery requests on the adoptive node during the grace period;
      decrementing the cluster wide migration counter;
      resuming file lock services at the adoptive node after NFS file lock recovery has completed; and
      resuming lock processing on the network file system if the counter is zero.

9. The computer system of claim 8, wherein the grace period for other network file system clients to connect to the adoptive node and reclaim file locks, and wherein the file locks were previously held by the network file system clients.

10. The computer system of claim 8 wherein the file lock services are controlled by a file lock recovery agent of the network file system.

11. The computer system of claim 10, wherein the file lock recovery agent is instantiated on each of the plurality of nodes comprising the cluster.

12. The computer system of claim 10, wherein the file lock recovery agent and the cluster file system entertains file lock requests from process identifiers of the file lock services which were previously registered with a cluster file system on the adoptive node.

13. The computer system of claim 10, wherein the file lock recovery agent and cluster file system is configured to entertain file lock requests originating only from the process identifiers or network file system server lock reclaim requests, wherein during the grace period, no new file lock requests are processed from network file system clients.

14. The computer system of claim 13, wherein file lock requests already held by the network file system clients are processed during the grace period, and wherein after the grace period expires and network file system file lock recovery is deemed to be complete, file lock services are resumed normally at the adoptive node.

15. A server computer system, comprising:
a computer system having a processor coupled to a computer readable storage media and executing computer readable code which causes the computer system to implement a file lock recovery agent that functions by:
incrementing a migration count, wherein the migration count is stored at each of the nodes comprising the cluster, wherein the incrementing is in response to a network file system server migration from one node of a cluster to a different node of the cluster, wherein the cluster comprises a plurality of nodes;
executing a distributed computer system having a plurality of nodes comprising a cluster;
initiating a fail over for a network file system server from one node of the cluster to an adoptive node of the cluster;
pausing lock processing on the failed over file system;
stopping file lock services at the adoptive node;
restarting file lock services at the adoptive node, wherein the restart causes the adoptive node to commence a grace period for other network file system clients to connect to the adoptive node and reclaim file locks;
after restarting file lock services, updating a cluster file system on the adoptive node with process identifiers;
selectively resuming network file system file lock recovery requests on the adoptive node during the grace period;
decrementing the cluster wide migration count;
resuming file lock services at the adoptive node after NFS file lock recovery has completed; and
resuming lock processing on the failed over file system if the count is zero.

16. The server computer system of claim 15, wherein the grace period allows for other network file system clients to connect to the adoptive node and reclaim file locks, and wherein the file locks were previously held by the network file system clients.

17. The server computer system of claim 15 wherein the file lock services are controlled by a file lock recovery agent or the network file system itself.

18. The server computer system of claim 15, wherein the file lock recovery agent is instantiated on each of the plurality of nodes comprising the cluster, and wherein the file lock recovery agent entertains file lock requests from process identifiers of the file lock services which were previously registered with a cluster file system on the adoptive node.

19. The server computer system of claim 15, wherein the file lock recovery agent is configured to entertain file lock requests originating only from the process identifiers or network file system server lock reclaim requests, wherein during the grace period, no new file lock requests are processed from network file system clients.

20. The server computer system of claim 19, wherein file lock requests already held by the network file system clients are processed during the grace period, and wherein after the grace period expires and network file system file lock recovery is deemed to be complete, file lock services are resumed normally at the adoptive node.

* * * * *